United States Patent
Mukai et al.

(10) Patent No.: US 6,874,595 B2
(45) Date of Patent: Apr. 5, 2005

(54) ELECTRIC POWER STEERING APPARATUS

(75) Inventors: Yoshinobu Mukai, Wako (JP); Kyoji Hamamoto, Wako (JP); Hiroaki Horii, Wako (JP); Kazuhisa Watanabe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,054

(22) Filed: Aug. 27, 2003

(65) Prior Publication Data

US 2004/0083822 A1 May 6, 2004

(30) Foreign Application Priority Data

Oct. 9, 2002 (JP) ........................................ 2002-296652

(51) Int. Cl.[7] .................................................. B62D 5/04
(52) U.S. Cl. ........................................ 180/446; 701/41
(58) Field of Search ................................ 180/446, 444, 180/443, 402; 701/41

(56) References Cited

U.S. PATENT DOCUMENTS

| | | | | |
|---|---|---|---|---|
| 5,927,430 A | * | 7/1999 | Mukai et al. ............... | 180/446 |
| 5,992,557 A | * | 11/1999 | Nakamura et al. .......... | 180/446 |
| 6,250,419 B1 | * | 6/2001 | Chabaan et al. ............ | 180/443 |
| 2003/0079933 A1 | * | 5/2003 | Chabaan ..................... | 180/446 |

FOREIGN PATENT DOCUMENTS

| | | |
|---|---|---|
| JP | 2001-287658 | 10/2001 |
| JP | 2002-234457 | 8/2002 |

* cited by examiner

*Primary Examiner*—Tony Winner
(74) *Attorney, Agent, or Firm*—Merchant & Gould P.C.

(57) ABSTRACT

An electric power steering apparatus is provided, which includes a steering torque sensor for detecting steering torque exerted on a steering system, a motor for exerting assist steering torque on the steering system, a motor current sensor for detecting drive current of the motor, a target current setting section for determining target current to be supplied for the motor based on the steering torque, a feedback control section for executing feedback control based on a deviation between the target current and the drive current of motor and a feedforward control section for executing feedforward control based on the target current. The apparatus has a feature that gain of the feedforward control is adapted to be greater as the speed of a vehicle increases.

2 Claims, 4 Drawing Sheets

ELECTRIC POWER STEERING APPARATUS

FIELD OF THE INVENTION

The present invention relates to an electric power steering apparatus, which exerts the power of a motor directly on a steering system, can relieve the steering torque required of a driver.

BACKGROUND OF THE INVENTION

An electric power steering apparatus having a motor for a steering system has been known, which employs a control unit for controlling the power supplied by the motor, relieves the steering torque required of a driver.

In the apparatus, an Electric Control Unit (ECU) determines target current to be supplied to the motor according to steering torque and the speed of a vehicle, then comparing the target current with the actual current flowing into the motor. The apparatus consequently controls the motor based on a deviation resulting from the comparison.

ECU has a microcomputer for controlling an electric power steering apparatus. The microcomputer controls feedback current so that the target and actual current can be in agreement; in other words, the deviation can be zero. In a feedback loop of current including the ECU and microcomputer, PID control is adopted in order to make the deviation converge to zero fast with a higher response However, the feedback control described above does not necessarily realize a sufficiently high response to the change of motor current. A method disclosed in Japanese Published Patent Applications 2001-287658 and 2002-234457 employs a combination of feedback and feedforward control. The feedback control adapts a motor drive signal to be greater according to a deviation and the feedforward control adapts the motor drive signal to be greater according to target current, respectively. In this way, the method improves a response to steering operation.

Feedforward control of this type has a feature that it generates a feedforward control element based on target current and deliverers the element directly. For example, when target current is small, the feedforward control generates a motor drive signal proportional to the target current and delivers the signal to a motor drive circuit. In this way, the addition of feedforward control improves the response to steering, compared with a method employing feedback control only.

However, the method still poses problems when the gain of feedforward control is increased so as to improve the response of combined feedforward and feedback control. The problems include heat dissipated by a motor, melting of a relay contact and the like due to a sudden increase in current resulting from an overshooting caused by a step steering input. In this connection, the step steering input occurs when a steering wheel is steered to an extreme position to cause a rack to strike an end-of-stop during low speed running of a vehicle or sudden steering is made in the reverse direction of large centrifugal force during high speed running of the vehicle.

On the other hand, adopting a measure to increase stability will decrease the response to steering, thereby degrading the steering feeling. Furthermore, the measure brings another problem that it takes long to damp overshooting and vibration once they occur. As discussed above, the response and stability have not been made compatible yet each other.

Also another problem exists that natural vibration is likely to occur if gain is increased.

SUMMARY OF THE INVENTION

The object of the present invention is to provide an electric power steering apparatus which can accomplish both high response and stability free of natural vibration The present invention provides an electric power steering apparatus, which includes a steering torque sensor for detecting steering torque exerted on a steering system, a motor for exerting assist steering torque on the steering system, a motor current sensor for detecting drive current of the motor, a target current setting section for determining target current to be supplied for the motor based on the steering torque detected by the steering torque sensor, a feedback control section for executing feedback control based on a deviation between the target current and the drive current of motor and a feedforward control section for executing feedforward control based on the target current. The apparatus has a feature that gain of the feedforward control is adapted to be greater as the speed of a vehicle increases.

The apparatus can thus not only suppress overshooting which is likely to occur during low speed running of a vehicle, thereby improving the stability but also increase the response during high speed running, thereby improving the damping of vibration.

The present invention also provides an apparatus, which has a feature that the gain of the feedback control is adapted to be greater as the speed of vehicle increases.

In this way, the apparatus can restrict natural vibration to be likely to occur during low speed running of a vehicle, thereby increasing the stability.

DESCRIPTION OF THE PREFERRED EMBODIMENTS

Figure 1:
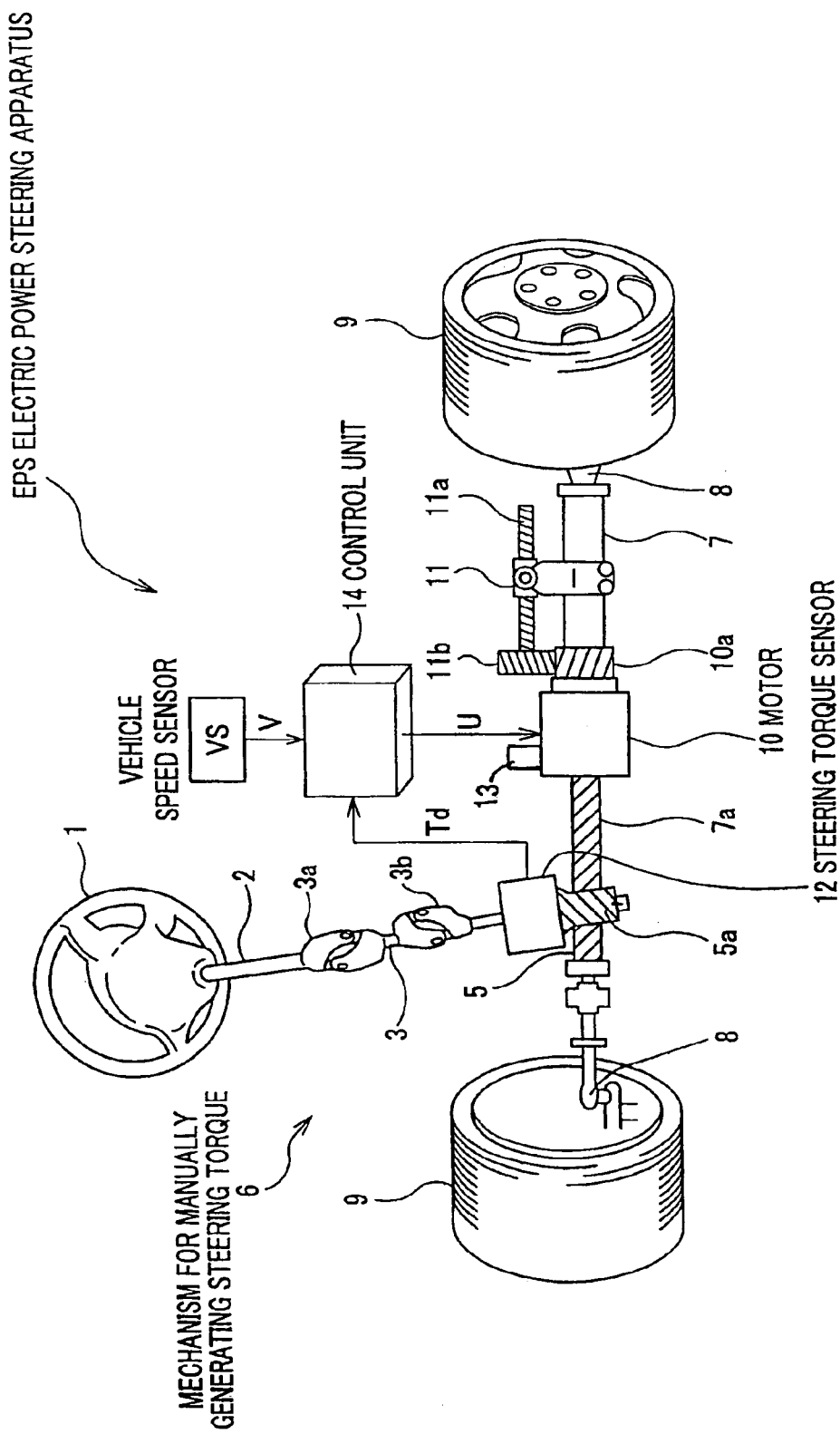
FIG. 1 is a diagram illustrating an electric power steering apparatus conceptually.
Figure 2:
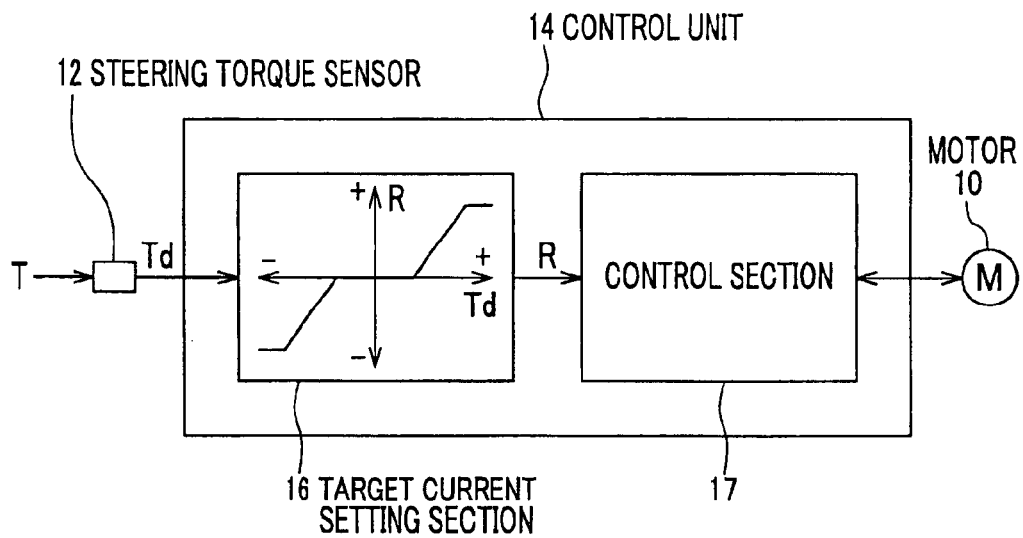
FIG. 2 is a block diagram illustrating a control unit in an electric power steering apparatus.

An embodiment of the present invention is now described referring to the accompanying drawings. FIG. 1 is a diagram illustrating the conceptual structure of an electric power steering apparatus. FIG. 2 is a block diagram illustrating a control unit of electric power steering apparatus.

First, the structure of an electric power steering apparatus EPS is described referring to FIG. 1.

As shown in FIG. 1, EPS includes the following: a steering wheel 1, a steering column 2, a connecting shaft 3, universal joints 3a, 3b, a rack and pinion mechanism 5, a pinion 5a, a mechanism 6 for manually generating steering torque, a rack shaft 7, rack teeth 7a, tie rods 8, front wheels 9, a motor 10, a drive helical gear 10a, a ball screw mechanism 11, a screw shaft 11a, a helical gear 11b, a steering torque sensor 12 and a control unit 14.

In the electric power steering apparatus EPS, the steering column 2, which is integrally connected to the steering wheel 1, is further connected to the pinion 5a of rack and pinion mechanism 5 via the connecting shaft 3 having the universal joints 3a, 3b, thereby forming the mechanism 6 for manually generating steering torque.

The pinion 5a meshes with rack teeth 7a and thereby the rotational movement of steering wheel 1 is converted to the axially reciprocal movement of rack shaft 7, to which the forward wheels 9 is connected via the tie rods 8. In this way, handling of the steering wheel 1 by a driver will apply a steering motion to the forward wheels 9 via the mechanism 6 and the like, thereby varying the direction of a vehicle.

The motor 10, which supplies the mechanism 6 with assist torque to decrease the steering torque manually applied so that the effort required of a driver can be relieved, is disposed coaxially with the rack shaft 7. The assist steering torque supplied by the motor 10 via the ball screw mechanism 11, which is installed substantially parallel with the rack shaft 7, is converted into force to cause the translational movement of rack shaft 7.

The drive helical gear 10a is integrally attached to the rotor of motor 10. The drive helical gear 10a meshes with the helical gear 11b integrally connected to an end of the screw shaft 11a of ball screw mechanism 11. The nut of ball screw mechanism 11 is connected to the rack shaft 7. In this way, the motor 10 assists the steering torque applied by a driver and the resultant torque causes a steering movement for the forward wheels 9.

Description of sensors is now made.

In a steering gear box (not shown), a steering torque sensor 12 is disposed, which detects manual steering torque T acting on the pinion 5a. The steering torque sensor 12 converts the manual steering torque T into a manual steering torque signal Td and enters the signal Td in the control unit 14. The control unit 14 drives the motor 10 receiving the manual steering torque signal Td, thereby controlling steering assist torque generated by the motor 10. In the electric power steering apparatus EPS, there is a motor current sensor 13 for detecting the drive current of the motor (actual motor current Y), which flows into the motor 10.

The control unit 14 is described referring to FIG. 2.

FIG. 2 is a block diagram illustrating the control unit 14 of an electric power steering apparatus EPS. The control unit 14 including a microcomputer and a peripheral circuit (not shown), in which the microcomputer reads out a program stored in a read only memory (ROM) (not shown), executes a module such as a target current setting section 16 to be described later, thereby controlling the electric power steering apparatus EPS. The control unit 14 has input and output ports for entering and delivering signals, information and commands. Also the control unit 14 has an analogue-to-digital (AD) converter for converting analogue signals into digital signals to be processed in the microcomputer, a digital-to-analogue (DA) converter for converting digital signals processed in the microcomputer into analog signals, and the like.

As shown in FIG. 2, the control unit 14 has the target current setting section 16 which generates a signal of target current for the motor 10 and a control section 17 which drives the motor 10 according to the signal. The target current setting section 16 determines target assist torque based on a manual steering torque signal Td, delivering target current R which is required for driving the motor 10 to supply the target assist torque. As shown in the target current setting section 16 of FIG. 2 conceptually, the target current R of zero (dead band) is assigned when the manual steering torque Td is around zero, and the target current R, which increases according to manual steering torque Td, is assigned when the manual steering torque Td reaches equal to or greater than a predetermined value. In this connection, it may be possible to select target current R in such a manner that the target current R takes a larger value when reaction force from the ground surface is large during low speed running of a vehicle and a smaller value to achieve driving stability during high speed running.

Figure 3:
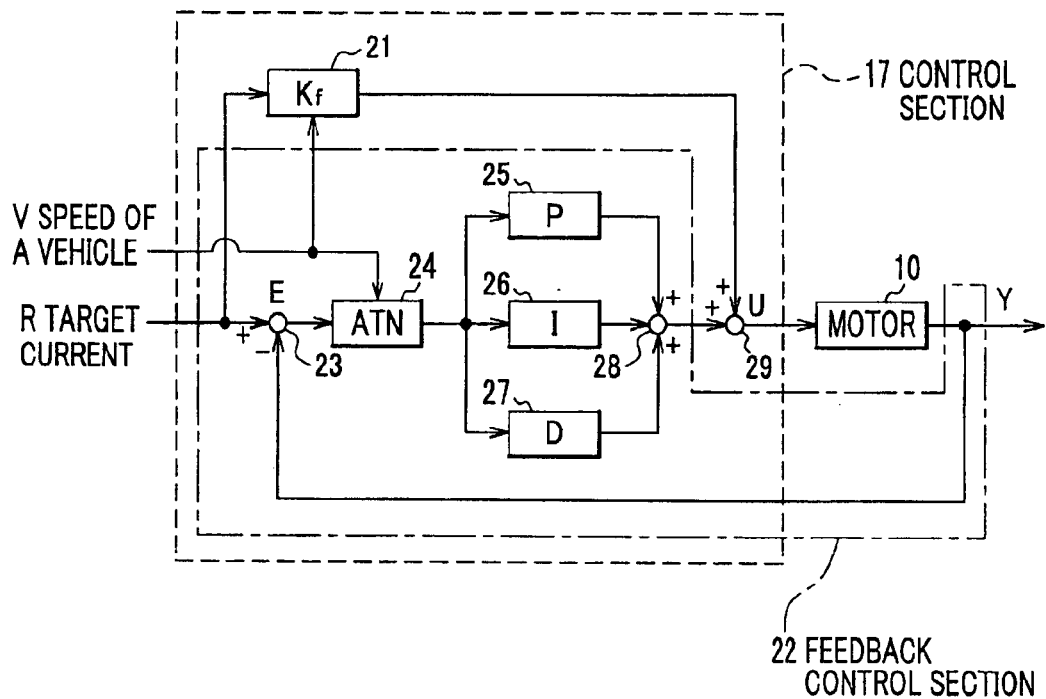
FIG. 3 is a block diagram illustrating functional structure of a control section shown in FIG. 2.

The control section 17 shown in FIG. 2 is described in detail referring to FIG. 3.

FIG. 3 is a block diagram illustrating the functional structure of control section 17. As shown in FIG. 3, the control section 17 includes a feedforward control section 21, a feedback control section 22 and an adder 29. The feedback control section 22 includes a deviation computing element 23, an attenuator 24, a proportional element 25, an integral element 26, a derivative element 27 and an adder 28.

The deviation computing element 23 computes a deviation E between target current R and actual motor current Y. The deviation E undergoes the processes executed by the proportional (P) element 25, integral (I) element 26 and derivative (D) element 27 after being attenuated by the attenuator 24. The deviation E after experiencing each process is added at the adder 28 and then further added to the output of feedforward control section 21 at the adder 29. Subsequently, the control section 17 delivers a motor drive signal U, which is adapted to compensate the deviation E to be zero, to a motor drive circuit (not shown) of motor 10. In this way, the addition of PID function to the feedback control section 22 improves the capability of tracking with regard to the change of target current R.

However, the feedback control section 22 described above does not provide sufficient response successfully. For example, when motor current is controlled by varying a duty ratio of pulse width modulation (PDM) signal, a problem associated with the response comes up. On one hand when the duty ratio is small, the rate of motor current change tends to be extremely small, but on the other hand when the duty ration exceeds a predetermined value, the rate tends to be large. This tendency leads to downgrading of the response to steering.

The present embodiment, which employs feedforward control that a motor drive signal U is adapted to increase according to target current R, improves the response to steering.

A feedforward control section 21, which generates and delivers a feedforward element, delivers a value proportional to target current R while the target current R is small and a constant value when the proportional value exceeds a predetermined value. In this way, the response to steering is improved.

The present embodiment further employs a method that the gains of feedforward control section 21 and feedback control section 22 are adapted to increase according to the speed V of a vehicle, which is detected by a vehicle speed sensor VS. In this way, the present invention can provide an electric power steering apparatus EPS which enables both the sufficient response to steering and driving stability free of occurrence of a natural vibration.

Description is now made for the philosophy of the embodiment of the present invention referring to FIG. 3.

A motor drive signal U, which the control unit 14 delivers to the drive circuit (not shown) of motor 10, is generated based on the expressions (1) and (2).

$$U = R \times Kf + At \times Kpid(s) \quad (1)$$

$$Kpid(s) = Kp + Ki/s + Kds \quad (2)$$
$$= Kp(1 + 1/Tis + Tds)$$

where: R is target current
Kf is gain of feedforward control section 21
At is gain of attenuator 24
Kpid(s) is a transfer function of PID control
Kp is a transfer function of proportional element 25
Ki is a transfer function of integral element 26
Kd is a transfer function of derivative element 27
S=jω
Ti=Kp/Ki
Td=Kd/Kp The gains Kf and At of feedforward control section 21 and attenuator 24 are adapted to be variable according to the speed V of a vehicle, respectively.

Figure 4:
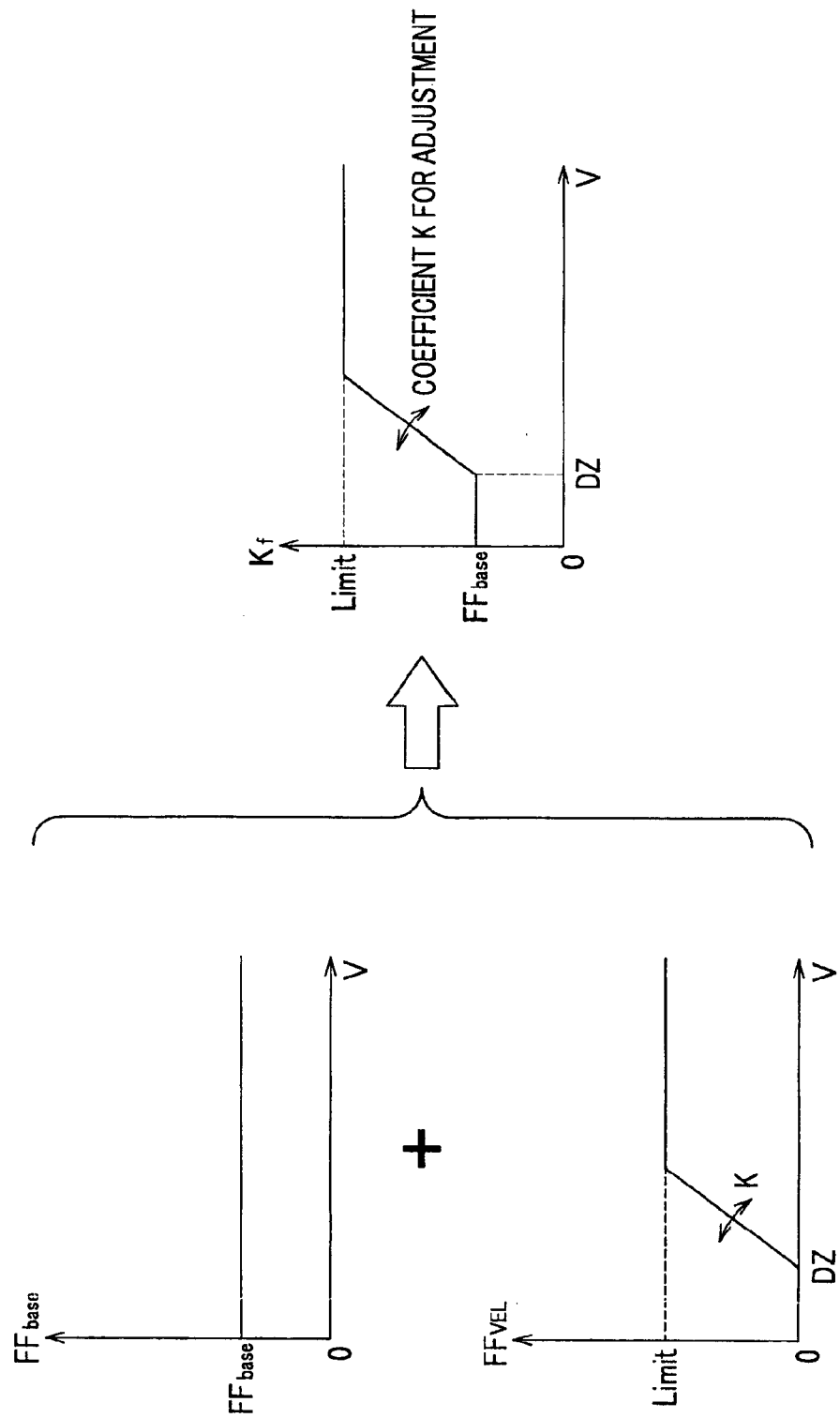
FIG. 4 is a figure showing the variation of gain for a feedforward control section with regard to the speed of a vehicle.

The gain Kf of feedforward control section 21 is adapted to be a summation of a constant FFbase independent of the speed V of a vehicle and an FFvel varying according to the speed V, as represented by an expression (3) and shown in FIG. 4. Furthermore, the FFvel represented by an expression (4) is separated into a dead zone DZ independent of the speed V during low speed running of a vehicle, a varying portion according to the speed V and a constant portion of Limit independent of the speed V during high speed running. In this connection, K represents a coefficient for adjustment.

$$Kf=FFbase+FFvel \quad (3)$$

$$FFvel=K \times (V-DZ) \; (<\text{Limit}) \quad (4)$$

In this way, during low speed running of a vehicle when a steep rise of steering torque (step input) tends to occur as a result of striking a rack to an end-of-stop caused by handling of a steering wheel 1 to an extreme position, overshooting is restricted by adopting a low gain for feedforward control. On the other hand, setting of high feedforward gain can increase the response and improves damping of vibration during high speed running.

Figure 5:
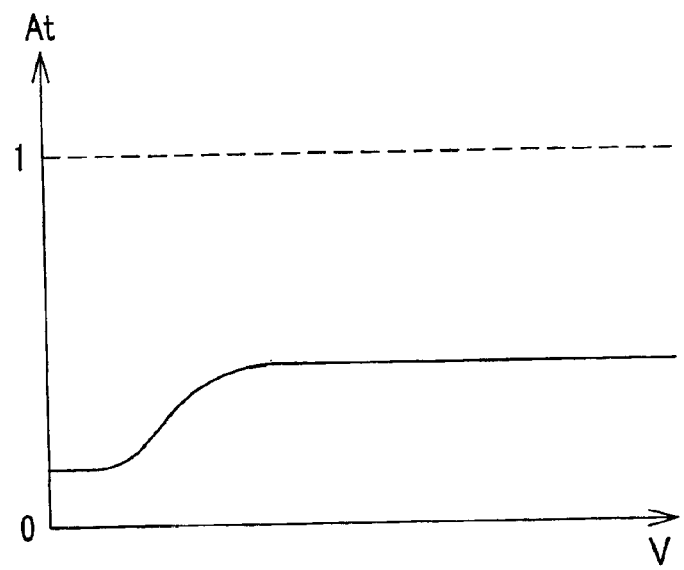
FIG. 5 is a figure showing the variation of gain for an attenuator in a feedback control section.

The feedback control section 22 has characteristics that setting of high gain increases the response but possibly causes resonance due to natural vibration. In order to solve this problem, the present embodiment employs a method that the gain At of attenuator 24 is adapted to be smaller while the speed V of a vehicle is low as shown in FIG. 5. In this way, the resonance which tends to occur at a lower natural frequency can be avoided.

Figure 6:
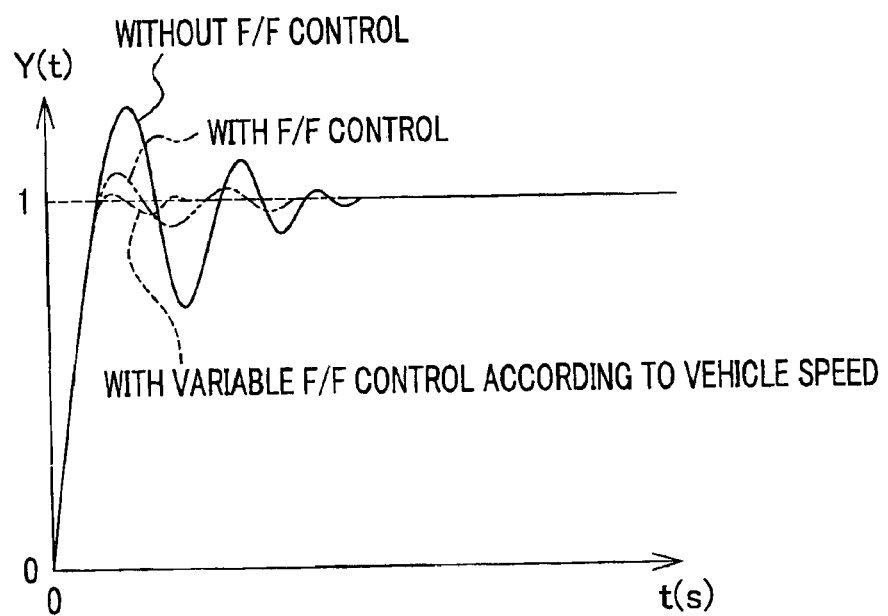
FIG. 6 is a figure showing the response to a step input in an electric power steering apparatus according to the present invention.

FIG. 6 is a figure showing the response to a step input at a control section 17, comparing cases employing different control methods. The vertical axis represents normalized motor current Y(t), actual motor current divided by target current, and the horizontal axis represents elapsed time in second. As shown by a solid line in FIG. 6, when feedforward (F/F) control is not adopted, large overshooting occurs and it takes long to damp the overshooting. If F/F control is introduced, as shown by a two-dot chain line, the overshooting is suppressed and it takes shorter to damp the overshooting. If gain variable F/F control according to the speed V of a vehicle, as shown by a broken line, it is much more improved.

It will now be appreciated from the foregoing description that the present invention is not limited to the particularly illustrated embodiment discussed above and may be carried out in various modified forms. It is not limited to the embodiment describe above, which employs a method that the gain Kf of feedforward section 21 and gain At of feedback control section 22 are both adapted to increase according to the speed V of a vehicle. For example, only the gain Kf may be adapted to increase according to the speed V.

What is claimed is:

1. An electric power steering apparatus comprising:
   a steering torque sensor for detecting steering torque exerted on a steering system;
   a motor for exerting assist steering torque on the steering system;
   a motor current sensor for detecting drive current of the motor;
   a target current setting section for determining target current to be supplied for the motor based on the steering torque detected by the steering torque sensor;
   a feedback control section for executing feedback control based on a deviation between the target current and the drive current of motor; and
   a feedforward control section for executing feedforward control based on the target current,
   wherein gain of the feedforward control is greater as the speed of a vehicle increases.

2. The apparatus according to claim 1 wherein gain of the feedback control is greater as the speed of vehicle increases.

* * * * *